US008228547B2

(12) United States Patent
Tanimoto et al.

(10) Patent No.: US 8,228,547 B2
(45) Date of Patent: Jul. 24, 2012

(54) IMAGE SOURCE APPARATUS AND METHOD OF ACQUIRING INFORMATION FROM PRINTER

(75) Inventors: Akihito Tanimoto, Chofu (JP); Nagomi Mine, Hino (JP); Susumu Goto, Misato (JP)

(73) Assignee: Seiko Epson Corporation, Tokyo (JP)

( * ) Notice: Subject to any disclaimer, the term of this patent is extended or adjusted under 35 U.S.C. 154(b) by 1362 days.

(21) Appl. No.: 11/710,178

(22) Filed: Feb. 23, 2007

(65) Prior Publication Data

US 2008/0037056 A1  Feb. 14, 2008

(30) Foreign Application Priority Data

Feb. 23, 2006  (JP) ............................... P2006-046351
Nov. 21, 2006  (JP) ............................... P2006-314171

(51) Int. Cl.
  *G06F 3/12*  (2006.01)
  *G06K 15/00*  (2006.01)
  *H04N 5/225*  (2006.01)
(52) U.S. Cl. .................... 358/1.16; 358/1.15; 348/207.2
(58) Field of Classification Search ................ 358/1.15, 358/1.16; 348/207.2
  See application file for complete search history.

(56) References Cited

U.S. PATENT DOCUMENTS

| 2003/0184781 | A1 | 10/2003 | Laughlin |
| 2004/0021902 | A1 | 2/2004 | Ogiwara et al. |
| 2005/0057772 | A1* | 3/2005 | Mikami et al. ............... 358/1.15 |
| 2005/0254089 | A1* | 11/2005 | Oliver et al. ................. 358/1.16 |

FOREIGN PATENT DOCUMENTS

| CN | 1485796 A | 3/2004 |
| JP | 2003233472 A | 8/2003 |
| JP | 2005-088572 | 4/2005 |
| JP | 2005284374 A | 10/2005 |

OTHER PUBLICATIONS

"Digital Photo Solutions for Imaging Devices," published by Camera & Image Products Association on Feb. 3, 2003.

* cited by examiner

*Primary Examiner* — Twyler Haskins
*Assistant Examiner* — Fred Guillermety
(74) *Attorney, Agent, or Firm* — Nutter McClennen & Fish LLP; John J. Penny, Jr.; Christina M. Sperry

(57) ABSTRACT

An image source apparatus includes: a driver, operable to send the image data to the printer and to cause the printer to execute the printing based on the image data, in accordance with a prescribed standard; an application processor; and a storage. When the driver receives an initialization request from the application processor, the driver, after notifying the application processor of an acknowledgement of the initialization request, carries out an initialization process in accordance with the received initialization request, and the driver, after finishing the initialization process, acquires information on a plurality of items related to a specification of the printer from the printer in accordance with the prescribed standard and stores the information in the storage. When the driver receives an acquisition command for acquiring any of the plurality of items from the application processor, the driver returns information on the item related to the acquisition command to the application processor with reference to the storage.

14 Claims, 6 Drawing Sheets

IMAGE SOURCE APPARATUS AND METHOD OF ACQUIRING INFORMATION FROM PRINTER

BACKGROUND

1. Technical Field

The present invention relates to an art for carrying out a so-called direct printing using a host device of a printer which operates on a single task OS.

2. Related Art

There is an art of a so-called direct printing in which a digital camera or the like is directly connected to a printer, and the digital camera, being used as an image source apparatus, sends image data to the printer, and causes the printer to print them. A representative standard in the direct printing is PictBridge.

In a case of carrying out the direct printing by using the PictBridge, in the event that there is an instruction to acquire a printer's Capability, which is a specification related to the printing by the printer, from a high order application, a PictBridge driver issues a DPS_GetCapability command to the printer, and acquires the printer's Capability (for example, JP-A-2005-88572).

However, in the technique of JP-A-2005-88572, as, on receiving a Capability acquisition command from the high order application, the PictBridge driver carries out a DPS_GetCapability operation, unless the high order application is notified that there has been a response of DPS_ConfigurePrintService which should be made prior to the DPS_GetCapability operation, the Capability acquisition command from the high order application is not issued. That is, for as long as the high order application is not notified that there has been the response of DPS_ConfigurePrintService, the high order application continues to await the response.

Furthermore, the CPS_GetCapability command is issued to the printer a number of times but, when, on receiving the Capability acquisition command from the high order application, the PictBridge driver issues the DPS_GetCapability command, unless there is a response thereto, a next Capability acquisition command is not issued either, and the high order application continues to await the response.

In the event of the heretofore described kind of situation, no problem arises when the high order application and the PictBridge driver operate on separate tasks but, for example, in a case in which they operate on an identical task as on a single task OS, as the high order application occupies the OS until there is a response from the printer, all processes in the image source apparatus are stopped.

SUMMARY

An advantage of some aspects of the invention is to provide an image source apparatus, for a direct printing, which operates reliably even on a single task OS. The advantage can be attained as at least one of the following aspects:

An image source apparatus which sends image data to a printer directly connected thereto and causes the printer to execute a printing, the image source apparatus comprising:
a driver, operable to send the image data to the printer and to cause the printer to execute the printing based on the image data, in accordance with a prescribed standard;
an application processor; and
a storage, wherein
when the driver receives an initialization request from the application processor, the driver, after notifying the application processor of an acknowledgement of the initialization request, carries out an initialization process in accordance with the received initialization request, and the driver, after finishing the initialization process, acquires information on a plurality of items related to a specification of the printer from the printer in accordance with the prescribed standard and stores the information in the storage, and
when the driver receives an acquisition command for acquiring any of the plurality of items from the application processor, the driver returns information on the item related to the acquisition command to the application processor with reference to the storage.

The driver may, after finishing the initialization process, issue a request for acquiring the information on the plurality of items from the printer without receiving the acquisition command from the application processor.

The initialization request from the application processor may include information indicating at least one of the plurality of items, and the driver may acquire information on the at least one of the plurality of items included in the initialization request from the printer.

The prescribed standard may be PictBridge and the driver may be a PictBridge driver.

The application processor may transmit the received information from the driver to a prescribed interface screen.

An image source apparatus which sends image data to a printer directly connected thereto and causes the printer to execute a printing, the image source apparatus comprising:
a driver, operable to send the image data to the printer and to cause the printer to execute the printing based on the image data, in accordance with a prescribed standard;
an application processor; and
a storage, wherein,
when the driver receives an initialization request from the application processor, the driver, after notifying the application processor of an acknowledgement of the initialization request, carries out an initialization process in accordance with the received initialization request, and
after finishing the initialization process, when the driver receives a command for acquiring first one of a plurality of items related to a specification of the printer from the application processor, the driver acquires information on the plurality of items from the printer in accordance with the prescribed standard, returns information on the first one of the plurality of items to the application processor and stores information on at least the other of the plurality of items in the storage.

When the information on the plurality of items is stored in the storage and the driver receives a command for acquiring second one of the plurality of items from the application processor, the driver may return information on the second one of the plurality of items to the application processor with reference to the storage.

A method of acquiring information from a printer which performed by a driver included in an image source apparatus which sends image data to the printer directly connected thereto and causes the printer to execute a printing, in accordance with a prescribed standard, the method comprising:
receiving an initialization request from an application processor;
notifying the application processor of an acknowledgement of the initialization request;
carrying out an initialization process in accordance with the received initialization request;
after finishing the initialization process, acquiring information on a plurality of items related to a specification of the printer from the printer in accordance with the prescribed standard, and storing the information in a storage;

receiving an acquisition command for acquiring any of the plurality of items from the application processor; and returning information on the item related to the acquisition command to the application processor with reference to the storage.

A method of acquiring information from a printer which performed by a driver included in an image source apparatus which sends image data to the printer directly connected thereto and causes the printer to execute a printing, in accordance with a prescribed standard, the method comprising:

receiving an initialization request from an application processor;

notifying the application processor of an acknowledgement of the initialization request;

carrying out an initialization process in accordance with the received initialization request;

after finishing the initialization process, receiving an acquisition command for acquiring first one of a plurality of items related to a specification of the printer from the application processor;

on receiving the acquisition command, acquiring information on the plurality of items from the printer in accordance with the prescribed standard and returning information on the first one of the plurality of items to the application processor; and storing information on at least the other of the plurality of items in a storage.

A computer-readable recording medium in which a computer program causing the driver of the image source apparatus to perform the method is recorded.

The present disclosure relates to the subject matter contained in Japanese patent application Nos. 2006-046351 filed on Feb. 23, 2006 and 2006-314171 filed on Nov. 21, 2006, which are expressly incorporated herein by reference in its entirety.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, a description will be given, with reference to the drawings, of a printing system according to an embodiment of the invention.

Figure 1:
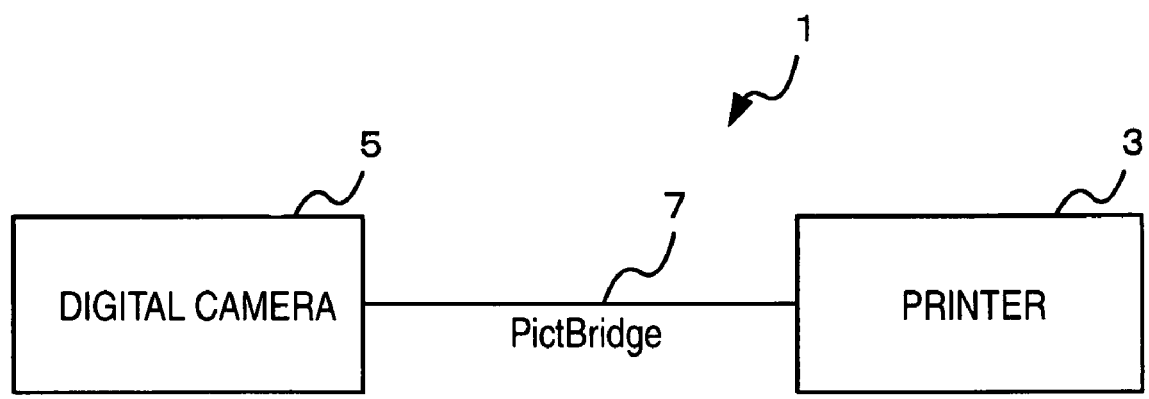
FIG. 1 is a configuration diagram of a printing system according to an embodiment of the invention.

FIG. 1 is a configuration diagram of a printing system 1 according to the embodiment.

The system 1 includes a printer 3 and a digital camera 5, both of which are directly connected through a communication cable 7. The digital camera 5 which is an image source apparatus provides the printer 3 with image data, and the printer 3 executes a printing.

In the embodiment, the printer 3 is mounted with a USB host controller, and the digital camera 5 is mounted with a USB device controller. With this configuration, the printer 3 and the digital camera 5 carry out communication in accordance with a USB (Universal Serial Bus).

Also, in the embodiment, a transfer (communication) of the image data and exchange of information related to a printer specification to be described hereafter are performed in accordance with a PictBridge standard.

A configuration and a function, which are to be described hereafter, of the digital camera 5 are realized, for example, by causing a computer system including a processor and a memory to execute a prescribed computer program.

As the image source apparatus, apart from the digital camera, it is acceptable to use another digital instrument storing the image data, such as a mobile phone equipped with a camera or a photo viewer.

Figure 2:
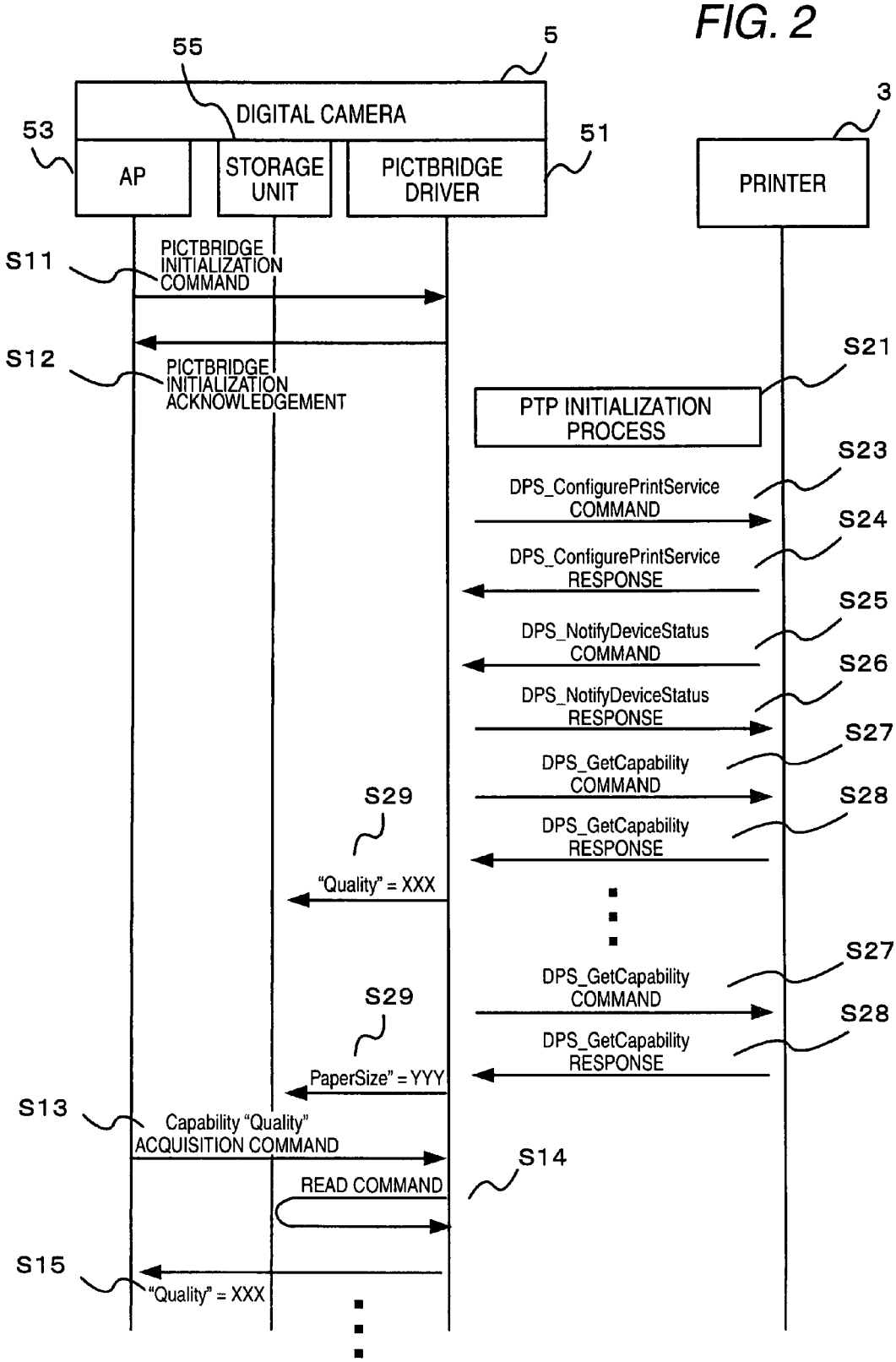
FIG. 2 is a diagram showing a communication procedure in the printing system.

FIG. 2 is a diagram showing a communication procedure in the printing system 1.

As shown in the same figure, the digital camera 5 includes a PictBridge driver 51, which carries out communication with the printer 3 in accordance with the PictBridge standard, a prescribed application (AP) 53 and a Capability storage unit 55.

The PictBridge driver 51, after carrying out a PictBridge initialization process in accordance with an instruction from the AP 53, acquires information related to a Capability and the like which the printer 3 has. The Capability refers to, for example, an image quality, a paper size, both side/one side and the like for a printing which the printer 3 can perform.

Firstly, after the printer 3 and the digital camera 5 are connected, the AP 53 issues a PictBridge initialization command to the PictBridge driver 51 (S11). On receiving the command, the PictBridge driver 51 returns an acknowledgement to the AP 53 (S12).

At this time, the AP 53 receives a response to the PictBridge initialization command, and temporarily finishes a task. That is, at this time, an OS of the digital camera 5 is released from the task of the AP 53. Consequently, another task becomes able to run even in a case in which the digital camera 5 operates on a single task OS.

The PictBridge driver 51, after returning the acknowledgement to the AP 53, executes a PTP (Picture Transfer Protocol) initialization process (S21).

Following the PTP initialization process, the PictBridge driver 51 issues a DPS_Configure_Print_Service command (S23), and receives a printer 3's response thereto (S24).

Subsequently, when the printer 3 gives notice of information indicating whether or not the printer is in a printable condition under a DPS_NotifyDeviceStatus command (S25), the PictBridge driver 51 responds to this (S26).

At this point, the PictBridge driver 51, without awaiting the instruction from the AP 53, issues a DPS_GetCapability command to the printer (S27). The DPS_GetCapability command refers to a command for acquiring information related to the Capability which the printer 3 has.

The PictBridge driver 51 obtains a printer 3's response to the DPS_GetCapability command (S28). The PictBridge driver 51 designates one item with regard to the Capability of the printer 3, and issues the DPS_GetCapability command. Then, The PictBridge driver 51 acquires information on the designated item in response thereto. Consequently, in order to acquire a plurality of items of the Capability, the PictBridge driver 51 designates a name of each item to be acquired, and issues a plurality of the DPS_GetCapability commands.

The Capability information acquired from the printer 3 is stored in the Capability storage unit 55 (S29).

In this way, the digital camera 5 can acquire the Capability information from the printer 3 in advance and hold it in the Capability storage unit 55.

The Capability information is, for example, supported printing quality information (a printer default, a standard, a high quality and the like), a paper size (a printer default, A4, L size, 4×6 and the like), a paper type by paper size (a printer default, regular paper, photographic paper and the like), layout information by paper size (a printer default, a presence/absence of a nondivision margin, 2 divisions, 4 divisions and the like), a file type (a printer default, Exif/JPEG, JPEG, GIF and the like), date printing support information (ON, OFF and the like), file name printing support information (ON, OFF and the like), image optimization printing support information (ON, OFF and the like), fixed size printing support information (A4, L size, 4×6 and the like) for designating to which size an image to be printed is to be fixed apart from the paper size, an image clip printing support information (ON, OFF and the like), and the like.

Herein, the PictBridge driver 51 issues the commands in steps S23 and S27, and the task is finished every time the PictBridge driver 51 issues each command. That is, when the PictBridge driver 51 issues the command, the OS is released. Consequently, while the PictBridge driver 51 is awaiting a response, the OS can process another task.

Next, when a prescribed time elapses after the AP 53 receives the acknowledgement of the PictBridge initialization command in step S12, the AP 53 issues a Capability acquisition command to the PictBridge driver 51 (S13). The Capability acquisition command designates an item which the AP 53 desires to acquire.

The PictBridge driver 51 which has received the Capability acquisition command from the AP 53 reads the information on the designated item from the Capability storage unit 55 acquiring and holding it in advance (S14), and returns the information to the AP 53 (S15).

The AP 53 repeatedly issues the Capability acquisition command with regard to a necessary item, and acquires necessary information from the PictBridge driver 51.

Thus, as the Capability information is held in advance in the Capability storage unit 55 inside the digital camera 5, when receiving the Capability acquisition command from the AP 53, it is not necessary to make an enquiry to the printer 3 again. Consequently, the AP 53 can acquire the Capability information within a very short time after issuing the Capability acquisition command. As a response is returned within a short time after the Capability acquisition command is issued, it follows that the AP 53 need only occupy the OS for a short time, and it is possible, even on the single task OS, to practically run the operation almost without problem.

It is acceptable, in step S11, to include information designating a Capability item in the PictBridge initialization command. At this time, it is acceptable that the PictBridge driver 51 acquires the information on the designated Capability item from the printer 3, and it is also acceptable that it preferentially acquires the information on the designated Capability item from the printer 3, and subsequently acquires information on an undesignated item from the printer 3.

Figure 3:
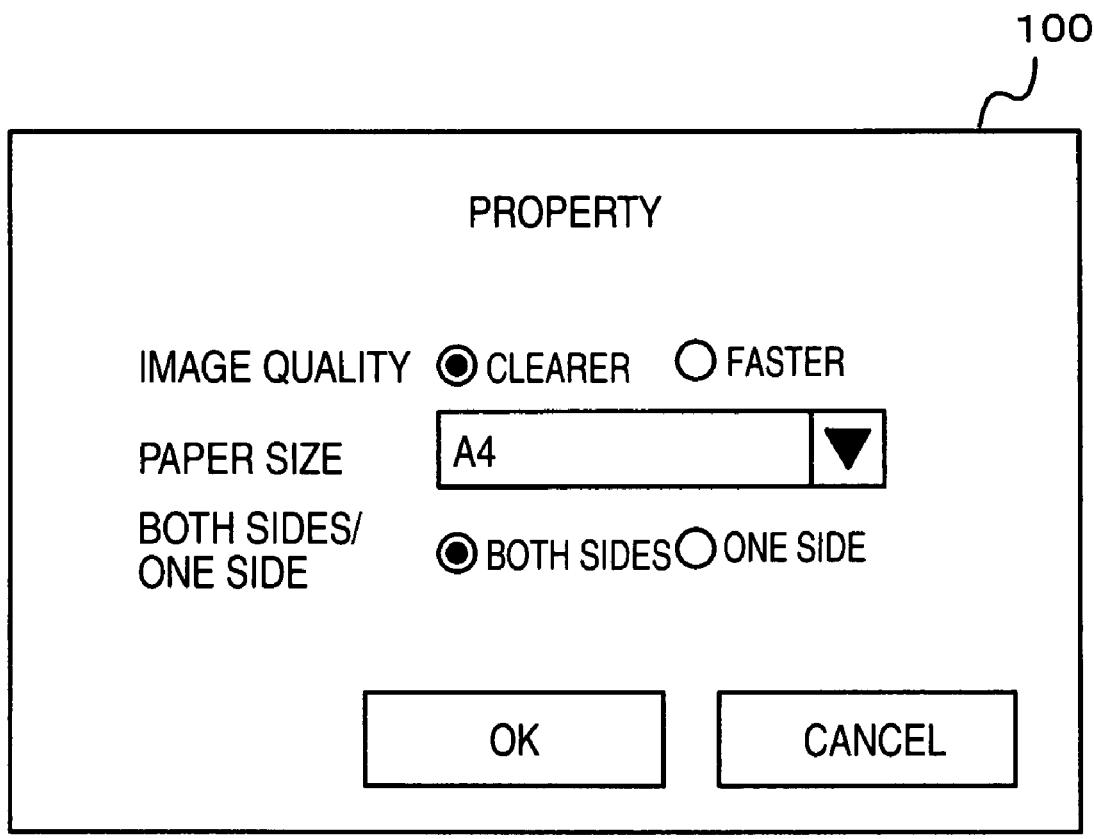
FIG. 3 is an example of a user interface screen.

Also, it is acceptable that the AP 53 causes the information acquired in the heretofore described way to be displayed on a kind of user interface screen 100 shown in FIG. 3.

Figure 4:
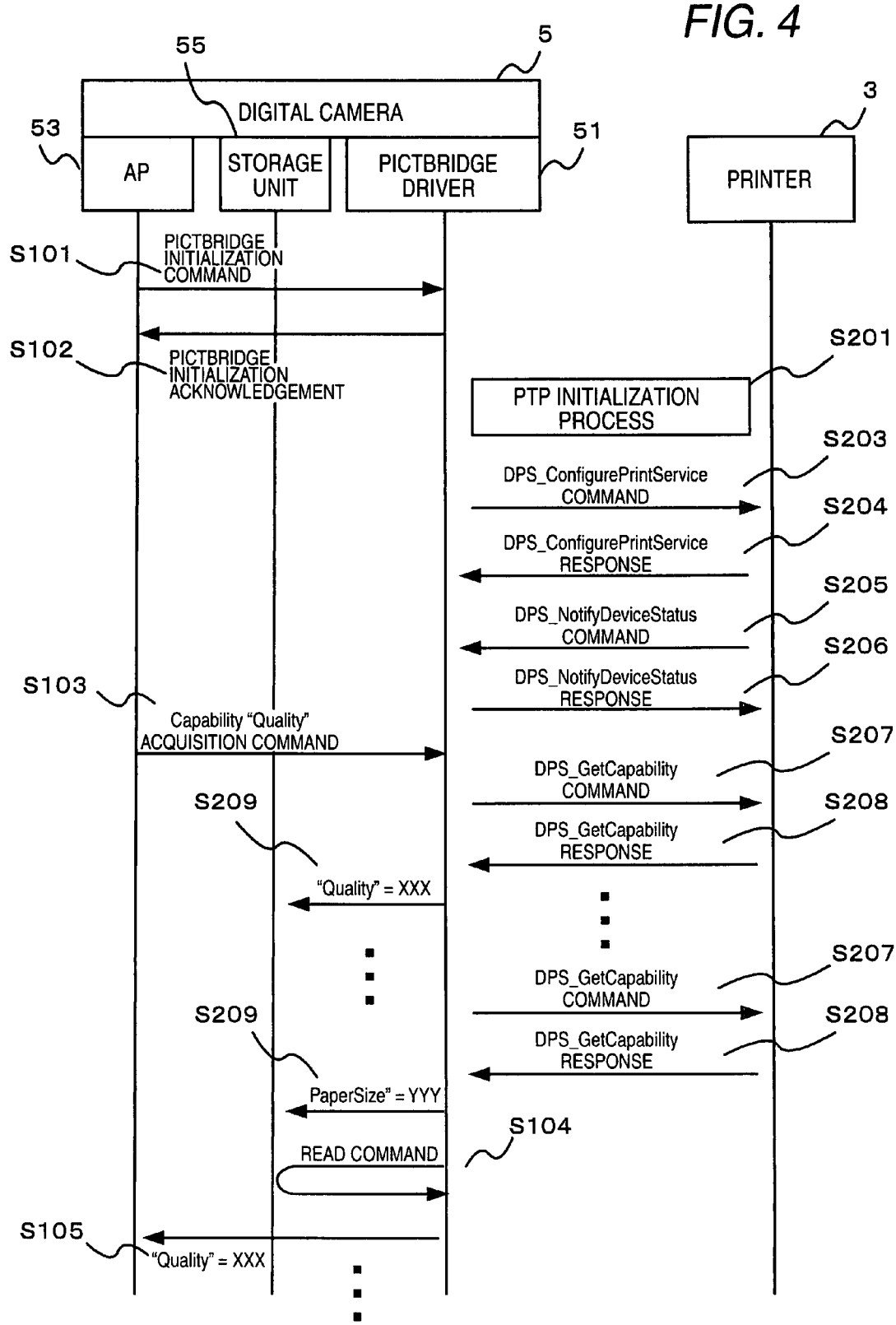
FIG. 4 is a diagram showing another communication procedure in the printing system.

FIG. 4 is a diagram showing another communication procedure in the printing system 1.

The communication procedure shown in FIG. 4 differs from the communication procedure of FIG. 2 in the following respect. That is, the difference is that, in the communication procedure of FIG. 2, following the PTP initialization process 21, the PictBridge driver 51, without awaiting the instruction from the AP 53, issues the DPS_GetCapability command to the printer 3 while, in the communication procedure of FIG. 4, after a PTP initialization process 201, the PictBridge driver 51 issues a DPS_GetCapability command 207 after receiving an instruction from the AP 53. Hereafter, a description will be given centering on the difference.

Firstly, the AP 53 issues a PictBridge initialization command to the PictBridge driver 51 and, on receiving the command, the PictBridge driver 51 returns an acknowledgement to the AP 53 (S101, S102).

Next, the PictBridge driver 51 executes the PTP initialization process (S201), following which the PictBridge driver 51 issues a DPS_Configure_Print_Service command (S203), and receives a printer 3's response thereto (S204). Furthermore, when the printer 3 gives notice of information indicating whether or not the printer is in a printable condition under a DPS_NotifyDeviceStatus command (S205), the PictBridge driver 51 responds to this (S206).

In this condition, the PictBridge driver 51 is placed in an idle state, awaiting a next command. At this time, the AP 53 issues a Capability acquisition command, and the PictBridge driver 51 acquires it (S103). The Capability acquisition command designates at least one item.

At this point, the PictBridge driver 51 issues the DPS_GetCapability command to the printer 3 (S207), and obtains a printer 3's response thereto (S208). Information on the Capability acquired from the printer 3 is stored in the Capability storage unit 55 (S209).

At this time, the PictBridge driver 51 issues the DPS_GetCapability command with regard to not only the item designated by the Capability acquisition command, but also all the other items, acquires information on each item, and stores it in the Capability storage unit 55. That is, in the embodiment, the PictBridge driver 51, when receiving a first Capability acquisition command from the AP 53, also acquires the Capability with regard to items other than an item designated by the command.

Then, after finishing acquiring them, the PictBridge driver 51 reads from the Capability storage unit 55 the information on the items designated by the Capability acquisition command from the AP 53 (S104), and returns it to the AP 53 (S105).

Even in the kind of processing order in the embodiment, it is possible to obtain the same advantage as in the process described in FIG. 2.

It is acceptable that the information on the item designated by the first Capability acquisition command from the AP 53, instead of being stored in the Capability storage unit 55, is returned from the PictBridge driver 51 to the AP 53. That is, in this case, the information on the items other than the item designated by the first Capability acquisition command is stored in the Capability storage unit 55. Consequently, hereafter, when a Capability acquisition command is issued with regard to another item from the AP 53, the PictBridge driver 51 acquires information on the item from the Capability storage unit 55, and returns it to the AP 53.

Also, as described heretofore, when receiving the first Capability acquisition command, the PictBridge driver 51 collectively acquires all the items of the Capability, but a plurality of separate acquisitions is also acceptable. For example, it is acceptable that an item to be acquired is determined in accordance with user interface screens shown below.

Figure 5:
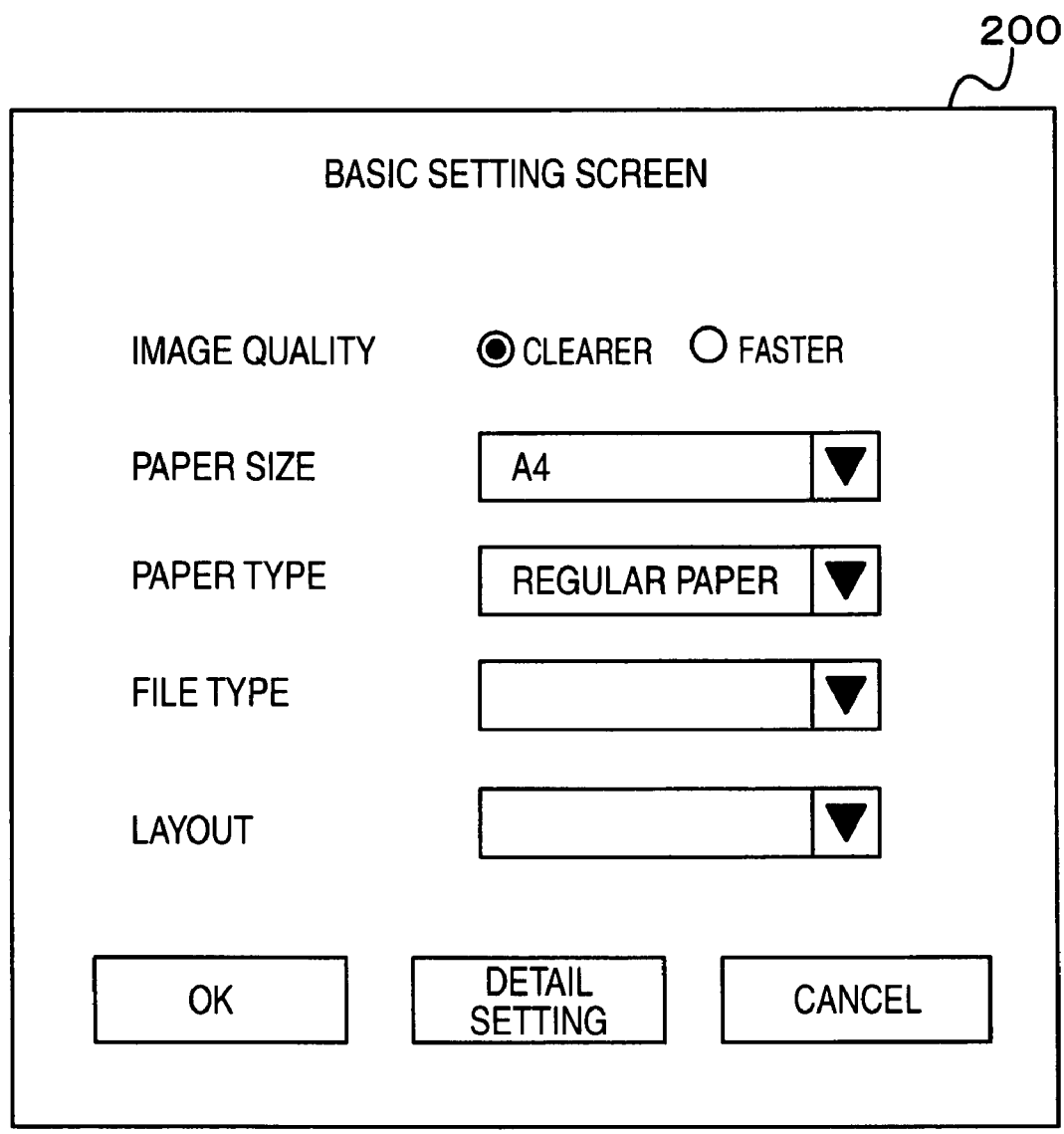
FIG. 5 is a view showing a basic screen for a printing setting.
Figure 6:
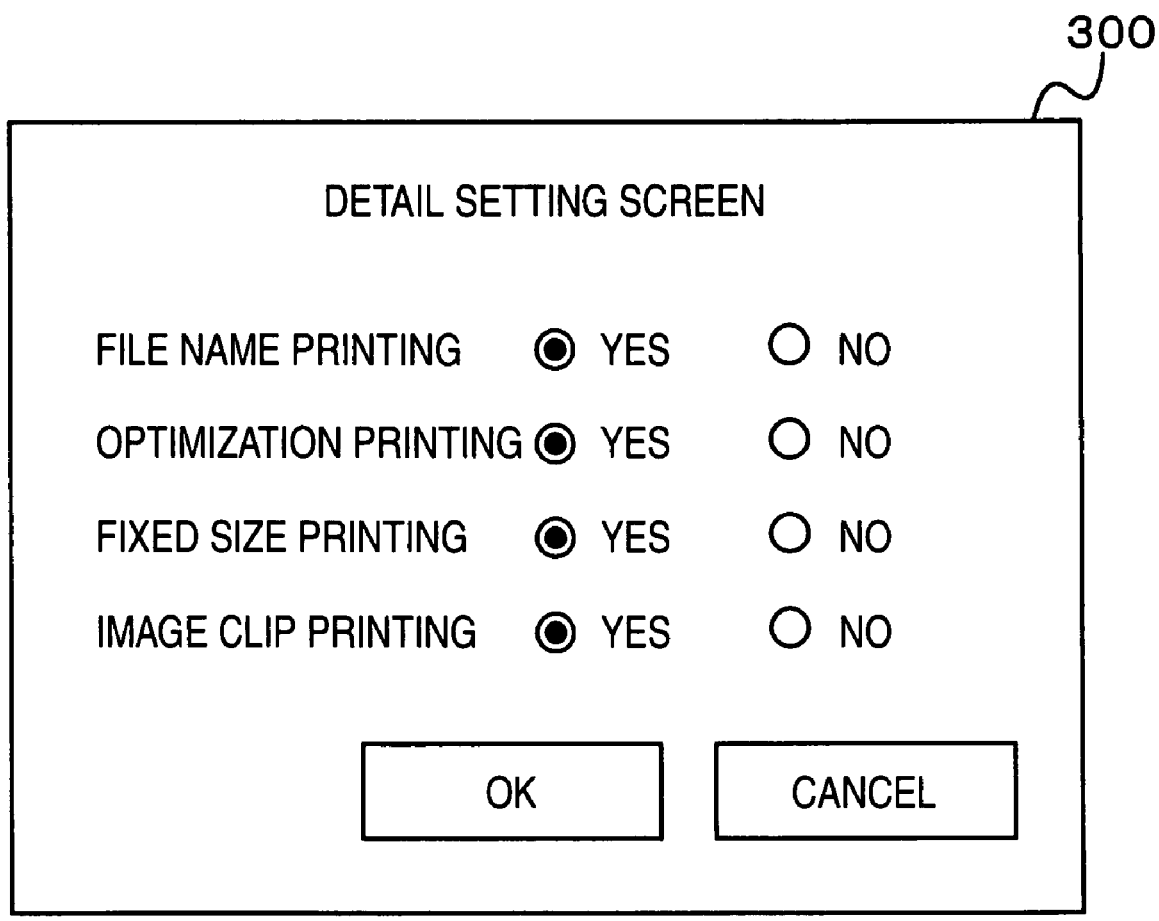
FIG. 6 is a view showing a detail screen for the printing setting.

For example a consideration will be given of a case in which there exist a user interface screen (a basic screen) 200, shown in FIG. 5, which displays basic information, and a user interface screen (a detail screen) 300, shown in FIG. 6, which displays detailed information. At this time, in a case of displaying the basic screen 200 on the digital camera 5, when the AP 53 issues a Capability acquisition command including the display of the basic screen 200, the PictBridge driver 51 issues a DPS_GetCapability command with regard to an item included in the screen (for example, the supported printing quality information, paper size, paper type, file type or supported layout information), and stores the acquired information in the Capability storage unit 55. Subsequently, a detail setting button is selected on the basic screen 200 and, in a case of displaying the detail screen 300 on the digital camera 5, when the AP 53 issues a Capability acquisition command including the display of the detail screen 300, the PictBridge driver 51 issues a DPS_GetCapability command with regard to an item included in the screen (for example, the file name printing support information, image optimization printing support information, fixed size printing support information or image clip printing support information), and stores the acquired information in the Capability storage unit 55.

According to an aspect of the invention, a time is shortened for which the application processor awaits a response and, even in a case of an operation on a single task OS, it is possible to contain the waiting time to such an extent that there is no practical problem.

According to an aspect of the invention, the application processor issues the initialization request, then, after receiving the acknowledgement thereof, when the OS is in a released condition, the driver automatically issues the request to acquire the plurality of items related to the specification of the printer from the printer, and receives a response thereto. At this time, in the event that a configuration is such as to release the OS every time the acquisition request is issued, even though the OS is the single task OS, one task does not occupy the OS for a long time.

The heretofore described embodiments of the invention are illustrated in order to describe the invention, and are not intended to limit the scope of the invention only to the embodiments. Those skilled in the art may practice the invention in other various aspects without departing from the scope of the invention.

For example, although, in the heretofore described embodiments, the PictBridge is used as the standard for the direct printing, the invention is applicable to a standard other than the PictBridge.

What is claimed is:

1. An image source apparatus which sends image data to a printer directly connected thereto and causes the printer to execute a printing, the image source apparatus comprising:
an application processor, operable to issue an initialization request and an acquisition command;
a driver, operable to send the image data to the printer and to cause the printer to execute the printing based on the image data, in accordance with a prescribed standard, according to a request from the application processor; and
a storage, wherein
when the driver receives the initialization request from the application processor, the driver, after notifying the application processor of an acknowledgement of the initialization request, carries out an initialization process in accordance with the received initialization request, and the driver, after finishing the initialization process, acquires information on a plurality of items related to a specification of the printer from the printer in accordance with the prescribed standard before receiving the acquisition command from the application processor and stores the information in the storage, and
when the driver receives the acquisition command for acquiring any of the plurality of items from the application processor, the driver returns information on the item related to the acquisition command to the application processor with reference to the storage.

2. The image source apparatus according to claim 1, wherein
the initialization request from the application processor includes information indicating at least one of the plurality of items, and
the driver acquires information on the at least one of the plurality of items included in the initialization request from the printer.

3. The image source apparatus according to claim 1, wherein
the prescribed standard is PictBridge and the driver is a PictBridge driver.

4. The image source apparatus according to claim 1, wherein
the application processor transmits the received information from the driver to a prescribed interface screen.

5. An image source apparatus which sends image data to a printer directly connected thereto and causes the printer to execute a printing, the image source apparatus comprising:
an application processor, operable to execute a predetermined process;
a driver, operable to send the image data to the printer and to cause the printer to execute the printing based on the image data, in accordance with a prescribed standard, according to a request from the application processor; and
a storage, wherein,
when the driver receives an initialization request from the application processor, the driver, after notifying the application processor of an acknowledgement of the initialization request, carries out an initialization process in accordance with the received initialization request, and
after finishing the initialization process, when the driver receives a command for acquiring a first one of a plurality of items related to a specification of the printer from the application processor, the driver acquires information on the plurality of items from the printer in accordance with the prescribed standard, returns information on the first one of the plurality of items to the application processor and stores information on at least the other of the plurality of items in the storage.

6. The image source apparatus according to claim 5, wherein,
when the information on the plurality of items is stored in the storage and the driver receives a command for acquiring second one of the plurality of items from the application processor, the driver returns information on the second one of the plurality of items to the application processor with reference to the storage.

7. The image source apparatus according to claim 5, wherein
the standard is PictBridge and the driver is a PictBridge driver.

8. The image source apparatus according to claim 5, wherein
the application processor transmits the received information from the driver to a prescribed interface screen.

9. A method of acquiring information from a printer which performed by a driver included in an image source apparatus which sends image data to the printer directly connected thereto and causes the printer to execute a printing, in accordance with a prescribed standard, according to a request from the application processor, the method comprising:

receiving an initialization request from the application processor by the driver;

notifying the application processor of an acknowledgement of the initialization request;

carrying out an initialization process in accordance with the received initialization request;

after finishing the initialization process, acquiring information on a plurality of items related to a specification of the printer from the printer in accordance with the prescribed standard before receiving an acquisition command from the application processor, and storing the information in a storage;

receiving the acquisition command for acquiring any of the plurality of items from the application processor by the driver; and returning information on the item related to the acquisition command to the application processor with reference to the storage.

10. The method according to claim 9, wherein
the initialization request from the application processor includes information indicating at least one of the plurality of items, and the driver acquires information on the at least one of the plurality of items included in the initialization request from the printer.

11. A method of acquiring information from a printer which performed by a driver included in an image source apparatus which sends image data to the printer directly connected thereto and causes the printer to execute a printing, in accordance with a prescribed standard, according to a request from the application processor, the method comprising:

receiving an initialization request from the application processor;

notifying the application processor of an acknowledgement of the initialization request;

carrying out an initialization process in accordance with the received initialization request;

after finishing the initialization process, receiving an acquisition command for acquiring a first one of a plurality of items related to a specification of the printer from the application processor;

on receiving the acquisition command, acquiring information on the plurality of items from the printer in accordance with the prescribed standard and returning information on the first one of the plurality of items to the application processor; and storing information on at least the other of the plurality of items in a storage.

12. The method according to claim 11, wherein,
when the information on the plurality of items is stored in the storage and the driver receives a command for acquiring second one of the plurality of items from the application processor, the driver returns information on the second one of the plurality of items to the application processor with reference to the storage.

13. A computer-readable recording medium in which a computer program causing the driver of the image source apparatus to perform the method according to claim 9 is recorded.

14. A computer-readable recording medium in which a computer program causing the driver of the image source apparatus to perform the method according to claim 11 is recorded.

* * * * *